United States Patent [19]

Tutumi

[11] Patent Number: 4,879,908
[45] Date of Patent: Nov. 14, 1989

[54] SUCTION AIR MEASURING DEVICE

[75] Inventor: Kazumichi Tutumi, Hyogo, Japan

[73] Assignee: Mitisubishi Denki Kabushiki Kaisha, Tokyo, Japan

[21] Appl. No.: 166,933

[22] Filed: Mar. 11, 1988

[30] Foreign Application Priority Data

Mar. 19, 1987 [JP] Japan .................................. 62-64904

[51] Int. Cl.$^4$ ............................................. G01F 1/32
[52] U.S. Cl. .................................. 73/861.23; 73/118.2
[58] Field of Search ............. 73/861.22, 861.23, 118.2; 364/510

[56] References Cited

U.S. PATENT DOCUMENTS 3,881,352  5/1975  McShane ........................... 73/861.23
4,240,299 12/1980  Joy et al. ........................... 73/861.23

FOREIGN PATENT DOCUMENTS 0104707  8/1980  Japan ................................. 73/861.22

Primary Examiner—Herbert Goldstein
Attorney, Agent, or Firm—Shughrue, Mion, Zinn, Macpeak & Seas

[57] ABSTRACT

A suction air measuring device comprises vortex detection means for detecting a Karman vortex signal of vortex in a suction conduit of an engine as a digital signal and storing it in a storage means at a predetermined time period and digitizing means for digitizing an output of the vortex detection means to obtain a Karman vortex pulse signal, setting or resetting the Karman vortex pulse signal when an output of the vortex detection means increases from a lower extreme thereof resetting or setting the Karman vortex signal when the output of the vortex detection means decreases from an upper extreme thereof by a predetermined value.

2 Claims, 3 Drawing Sheets

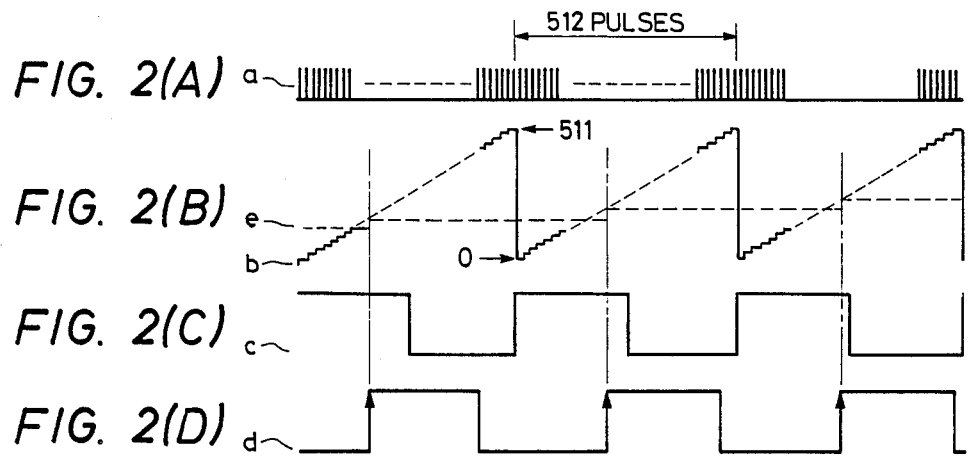
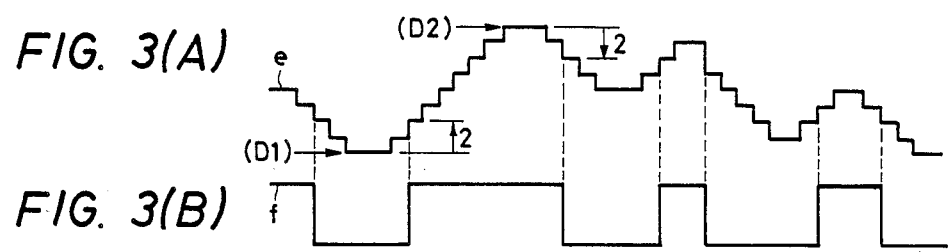
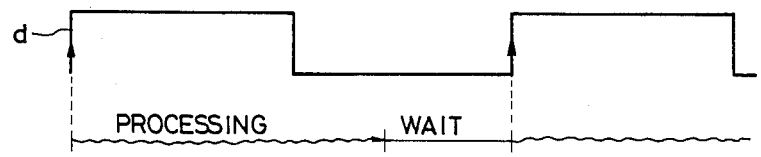

SUCTION AIR MEASURING DEVICE

BACKGROUND OF THE INVENTION

The present invention relates to a suction air measuring device for use in an electronic controlled fuel injection device of an automobile engine.

A method has been known in, for example, Japanese Utility Model Application Laid-Open No. 41665/1979, in which a vortex generating member is provided in a conduit and a flow rate of fluid passing therethrough is measured on the basis of the occurrence frequency of Karman vortex generated downstream of the vortex generating member. This method utilizes the fact that an ultrasonic signal wave transmitted or received through the conduit is phase-modulated by Karman vortex generated in the fluid. By demodulating the signal, the vortex signal is detected as an analog electric signal.

The analog electric signal is usually binarized by comparing it with a predetermined voltage by a voltage comparator and outputted as a Karman vortex pulse signal having a frequency equal to the occurence frequency of the vortex.

A use of such Karman vortex flow rate sensor as a suction air sensor of an automobile engine provides a problem that in, when a throttle valve of the engine is opened substantially, a pulsation of air due to a suction operation of the engine is produced in a suction conduit and an output level of the electrical signal is changed largely according to the pulsation of suction air.

When such an output signal is binarized according to the known method, a pulse drop problem occurs. In order to solve this problem, Japanese Utility Model Application Laid-Open No. 72119/1982 proposes the removal of the fluctuation of the analog electric signal due to pulsation of suction air by passing it through a differentiation circuit. In this solution, however, the signal level is lowered when a frequency thereof is low.

In order to remove the latter problem, in 72119/1982, an input characteristic of the differentiation circuit is changed according to an output of the pulse circuit, i.e., according to the pulse frequency of Karman vortex generated by the measuring device itself. Therefore, if such pulse drop once occurs, the pulse drop situation continues.

SUMMARY OF THE INVENTION

An object of the present invention is to provide a suction air measuring device for an automobile engine capable of providing a Karman vortex pulse signal exactly corresponding to an amount of suction air regardless of the pulsation of suction air due to engine operation.

The present suction air measuring device comprises vortex detection means for detecting a Karman vortex signal of a vortex generated behind a vortex generating member inserted into a suction outfit of an engine as a digital signal and storing it in a storage means at a predetermined time period and binarizing or digitizing means for binarizing or digitizing an output of the vortex detection means to obtain a Karman vortex pulse signal and setting or resetting the Karman vortex pulse signal when a variation of the output of the vortex detection means exceeds a predetermined value. When the output of the vortex detection means decreases, after a termination of increase, to a predetermined value or smaller, the Karman vortex pulse signal is reset or set.

BRIEF DESCRIPTION OF THE DRAWING

FIGS. 2A to 2D and 3A and 3B are timing charts of signals at various points in FIG. 1;

FIG. 5 is a timing chart showing the signal processing in the embodiment in FIG. 1.

DETAILED DESCRIPTION OF THE PREFERRED EMBODIMENT

Figure 1:
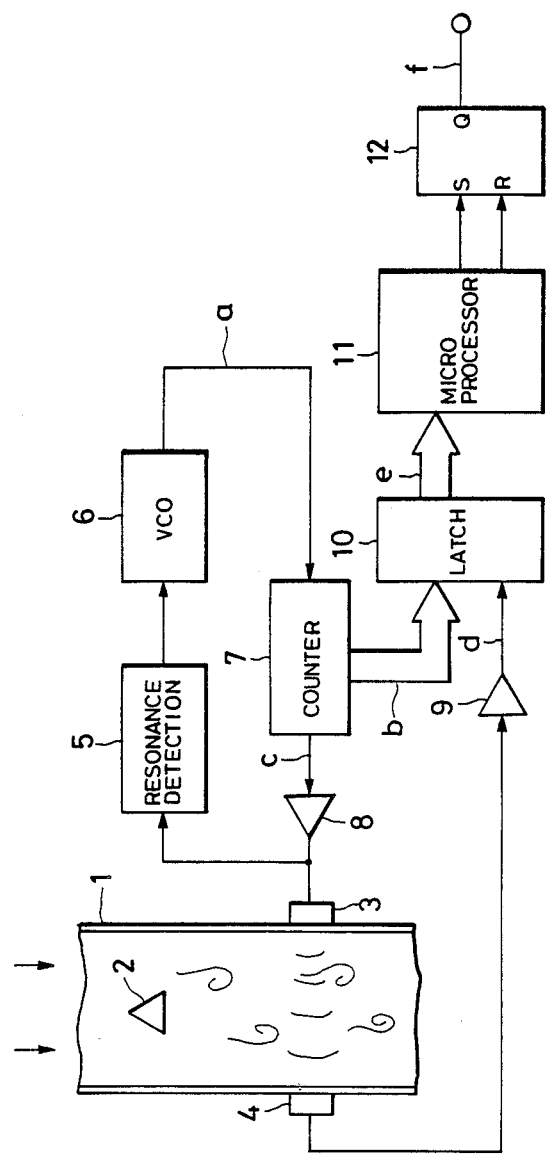
FIG. 1 is a block circuit diagram showing an embodiment of a suction air measuring device according to the present invention.

In FIG. 1, which is a block diagram of an embodiment of a suction air measuring device according to the present invention, a vortex generating member 2 is disposed in a predetermined position in a suction conduit of an engine and an ultrasonic receiving vibrator 4 detects Karman vortex generated behind the vortex generating member 2.

The ultrasonic vibrator 4 has a resonance frequency around 40 KHz and is disposed in the suction conduit 1 together with an ultrasonic transmitting vibrator 3 opposing thereto. The transmitting vibrator 3 has a resonance frequency around 40 KHz and is excited to transmit ultrasonic waves to the receiving vibrator 4.

A resonance detection circuit 5 detects a vibration of the ultrasonic transmitting vibrator 3 at its resonance frequency and provides a detection output to a voltage controlled oscillator 6.

The voltage controlled oscillator 6 responds to the output of the resonance detection circuit 5 to produce a pulse signal having a frequency around 20 MHz. The pulses of the pulse signal are counted by a counter 7 of 9 bits so that the frequency thereof is divided by 512.

A drive circuit 8 drives the ultrasonic transmitting vibrator 3 with the pulse signal whose frequency is divided by 512.

The sinusoidal output signal of the ultrasonic receiving vibrator 4 is wave-shaped by a wave-shaper 9 to obtain a pulse signal. A latch circuit 10 of 9 bits picks-up the content of the counter 7 at a timing corresponding to a leading pulse edge of the output pulse signal of the wave-shaper 9.

An output of the latch circuit 10, i.e., a change of the phase-demodulated signal, is judged by a microprocessor 11, upon a judgement made by which a flip-flop (FF) circuit 12 is set or reset. An output of the FF 12 is a Karman vortex pulse.

An operation of the device constructed as above will be described with reference to FIGS. 2A to 2D, in which FIG. 2A shows the output a of the voltage controlled oscillator 6, i.e., a clock input of the counter 7, FIG. 2B shows a count value b of the counter 7, FIG. 2C shows a most significant bit of the counter 7, i.e., the drive pulse of the ultrasonic transmitting vibrator 3 and FIG. 2D shows the output d of the wave-shaper 9. The content e of the latch circuit 10 is also known in FIG. 2B.

As shown in FIG. 2B, the counter 7 of 9 bits counts the output a of the voltage controlled oscillator 6 from 0 to 511 reciprocally. Therefore, the most significant bit thereof becomes the drive pulse c whose frequency is the oscillator output a divided by 512.

The ultrasonic transmitting vibrator 3 is driven by the drive pulse c through the drive circuit 8. The voltage controlled oscillator 6 is feedback-controlled by the resonance detection circuit 5 such that the frequency of the pulse c coincides with the resonance frequency of the ultrasonic transmitting vibrator 3.

Since the resonance frequency of the vibrator 3 is about 40 KHz, the oscillation frequency of the voltage controlled oscillator 6 is controlled to about 20 MHz (512×40 KHz resonance frequency).

The ultrasonic wave from the ultrasonic transmitting vibrator 3 is phase-modulated by Karman vortex in the suction conduit 1 and received by the ultrasonic receiving vibrator 4. An output waveform of the ultrasonic receiving vibrator 4 is substantially a sinusoidal wave whose frequency is about 40 KHz. This is wave-shaped by the wave-shaper 9, resulting in the phase-modulated receiving pulse d as shown in FIG. 2D. By picking-up the content of the counter 7 into the latch circuit 10 at the timing corresponding to the leading edge of the pulse d, the output e of the latch circuit 10 becomes the phase-demodulated signal.

That is, since the counter 7 serves as a frequency divider as well as a phase counter for dividing one period corresponding to 360° of the transmitting wave c by 512, the content of the counter 7 latched at the timing of leading edge of the received pulse d becomes the phase-demodulated signal.

The Karman vortex signal is detected as a digital electric signal (phase-demodulated signal) e, in this manner. The frequency of this phase-demodulated signal e, i.e., the Karman vortex frequency is practically from about 10 Hz to about 2500 Hz.

An amplitude of the phase-demodulated signal e is detected by the microprocessor 11 to obtain the Karman vortex pulse. This will be described with reference to FIGS. 3A and 3B in which FIG. 3A shows the phase-modulated signal e and FIG. 3B shows the Karman vortex pulse f which corresponds to the amount of suction air;

As shown in FIG. 3A, the microprocessor 11 sets the FF 12 when the signal e increases by 2 steps or more after it starts to increase and rests the FF 12 when the signal e decreases by 2 steps or more after it starts to decrease.

The amount of "2" steps corresponds to the content of the latch circuit 10, that is, "2" when 360° of one period of the drive pulse signal c for the vibrator is counted as 512.

Figure 4:
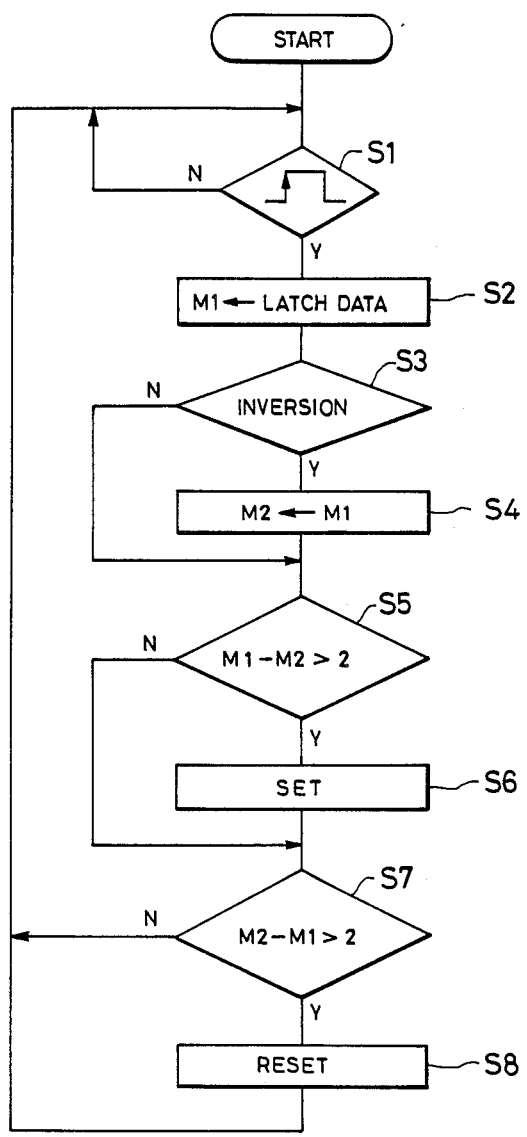
FIG. 4 is a flow chart showing a sequence of signal processing in the embodiment in FIG. 1.

The processing to be performed by the microprocessor 11 will be described with reference to a flow chart shown in FIG. 4. In step S1 in FIG. 4, the microprocessor 11 is put in a ready state for operation until the received pulse d starts to rise. Upon the leading edge of the pulse d at which the latch circuit 10 latches the phase-demodulated signal e, the microprocessor 11 reads the latched data and stores it in a memory M1, as shown in step S2.

Then, in step S3, extremes of the amplitude of the phase-demodulated signal are judged. That is, it is judged whether the signal e starts to increase from a lower extreme or to decrease from an upper extreme. When such extreme is detected, the preceding content of the memory M1, i.e., the value of the phase demodulated signal e at the time of extreme detection, is transferred to another memory M2 and stored therein, in step S4.

Therefore, the memory M2 stores the lower extreme value D1 (FIG. 3B) of the phase-demodulated signal e when it increases and the upper extreme value D2 (FIG. 3B) when it decreases.

In steps S5 and S6, it is determined whether not the content stored in the memory M1 is larger than that in the memory M2 by 2 steps. If yes, the FF 12 is set. When it is determined that the content of the memory M1 is smaller than that in the memory M2 by 2 steps in steps S7 and S8, the FF 12 is reset.

The above processing is repeated in synchronism with leading edges of the received pulse signal d.

FIG. 5 shows a timing relation between the leading edge of the received pulse d and the processing of the microprocessor 11.

The processing to be performed by the microprocessor 11 must be synchronized with the received pulse d, otherwise, an erroneous data read may occur when a leading edge of the received pulse comes in during a readout operation of the phase-demodulated signal e from the latch circuit 10 in the step S2.

As described, the Karman vortex signal is obtained by binarizing the phase-demodulated signal e by means of the detection of the extremes of the signal e by the microprocessor 11. Therefore, the present device has no dependency on the signal level thereof and hence the pulsation of suction air.

Further, due to the use of the microprocessor 11, there is no dependency on frequency of the demodulated signal.

What is claimed is:

1. A suction air measuring device for an engine, comprising a vortex generating member inserted into a suction conduit of said engine, vortex detection means for detecting a vortex signal indicative of Karman vortex generated behind said vortex generating member said vortex detection means including an ultrasonic transmitting vibrator disposed in said suction conduit together with an ultrasonic receiving vibrator such that an ultrasonic wave from said transmitting vibrator is phase-modulated by Karman vortex in said suction conduit and received by said receiving vibrator, said receiving vibrator outputting a phase-modulated signal, said vortex detection means further including means for obtaining a digital signal from said phase-modulated signal and means for storing said digital signal in a memory means at a predetermined period and a digitizing means for digitizing a content of said memory means to obtain a Karman vortex signal and for setting or resetting said Karman vortex signal when said digital signal of said vortex detection means starts to increase from a lower extreme thereof by a predetermined value and resetting or setting said Karman vortex signal when said digital signal of said vortex detection means decreases from an upper extreme thereof by a predetermined value.

2. The suction air measuring device as claimed in claim 1, wherein said digitizing means comprises a microprocessor for executing a predetermined program in synchronism with a storing timing of said digital signal in said memory means.

* * * * *

UNITED STATES PATENT AND TRADEMARK OFFICE
CERTIFICATE OF CORRECTION

PATENT NO. : 4,879,908
DATED : November 14, 1989
INVENTOR(S) : Kazumichi TUTUMI

It is certified that error appears in the above-identified patent and that said Letters Patent is hereby corrected as shown below:

On the title page, change name of assignee from "Mitisubishi" to --Mitsubishi--

Signed and Sealed this

First Day of January, 1991

Attest:

HARRY F. MANBECK, JR.

Attesting Officer

Commissioner of Patents and Trademarks